United States Patent [19]

Masaki

[11] Patent Number: 4,555,741

[45] Date of Patent: Nov. 26, 1985

[54] DEVICE FOR ELIMINATING INRUSH-CURRENT

[75] Inventor: Kazumi Masaki, Osaka, Japan

[73] Assignee: Ken Hayashibara, Okayama, Japan

[21] Appl. No.: 616,166

[22] Filed: Jun. 1, 1984

[30] Foreign Application Priority Data

Jun. 14, 1983 [JP] Japan ............................... 58-104867

[51] Int. Cl.[4] ............................................ H02H 9/02

[52] U.S. Cl. ...................................... 361/58; 323/908

[58] Field of Search .................... 361/58, 29; 323/908; 307/135; 315/310, DIG. 5

[56] References Cited

U.S. PATENT DOCUMENTS 3,222,572 12/1965 Powell, Jr. ...................... 315/310 X 3,529,210 9/1970 Ito et al. ............................... 361/58

3,781,637 12/1973 Potter ............................ 323/908 X

FOREIGN PATENT DOCUMENTS 2247816 4/1974 Fed. Rep. of Germany ...... 323/908

*Primary Examiner*—Reinhard J. Eisenzopf

*Attorney, Agent, or Firm*—Browdy and Neimark

[57] ABSTRACT

The present invention provides a device for eliminating inrush-current, comprising connecting a power switch, pair of diode in reverse parallel, a resistance, a rectifier, a time constant circuit and a thyristor in a manner such that an ac current is supplied to a load through the resistance for a period, determined by the time constant circuit, after switching-on of the power switch, and that the rated current is supplied to the load after lapse of the period by allowing the thyristor both to conduct and to short the resistance.

9 Claims, 4 Drawing Figures

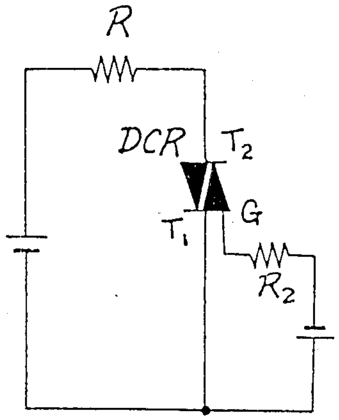
FIG.3
FIG.4
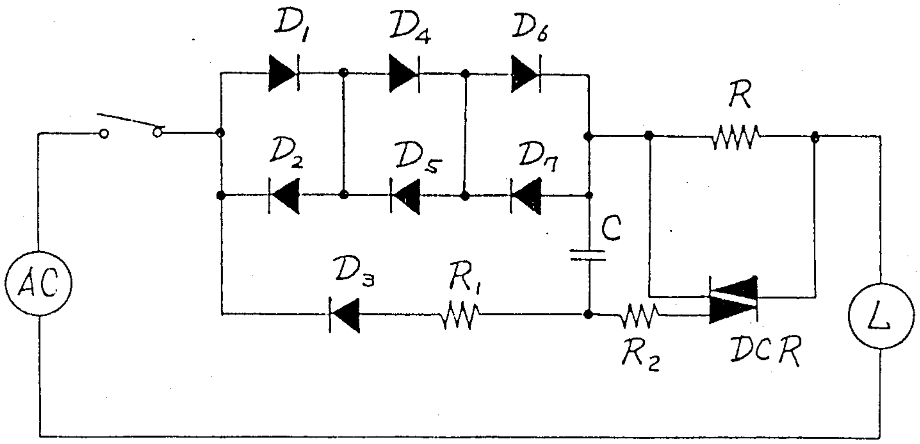

DEVICE FOR ELIMINATING INRUSH-CURRENT

FIELD OF THE INVENTION

The present invention relates to a device which can eliminate the occurrence of an inrush-current into an electric circuit, especially, incandescent lamp circuit.

DETAILED DESCRIPTION OF THE INVENTION

The resistance of an incandescent lamp at room temperature is approximately one-tenth of that in incandescent state. For example, the resistance of a non-lighted 100 watt incandescent lamp is 10 ohms, whereas that of a lighted 100 watt incandescent lamp is 100 ohms. When a 100 volt ac power supply is coupled to the incandescent lamp at its peak value (141 volts), the incandescent lamp inevitably receives an inrush-current which may go up to 14 amperes. Such inrush-current often snaps the filament of the incandescent lamp.

The present invention is intended to limit the current inflow into an incandescent lamp circuit for a prescribed time after switching-on with a series impedance of 50–100 ohms which is inserted in the circuit, and also to allow the incandescent lamp to receive its rated voltage by shorting the series resistance when its filament sufficiently increases in resistance with the increment in temperature after a lapse of the prescribed time. More particularly, the entity of the present invention is a device for eliminating inrush-current which is characterized by inserting a pairs of diodes, connected in reverse parallel, within a main current circuit; charging a voltage fall generated between the pair of diodes, which are operated in the nonlinear region of their current-voltage characteristic, to a CR-time constant circuit through a rectifier; and supplying the output of the time constant circuit to the gate of a bidirectional triode thyristor to allow the thyristor to conduct and also to short a series resistance which is inserted within the current circuit.

The figures show the examples according to the present invention.

Figure 1:
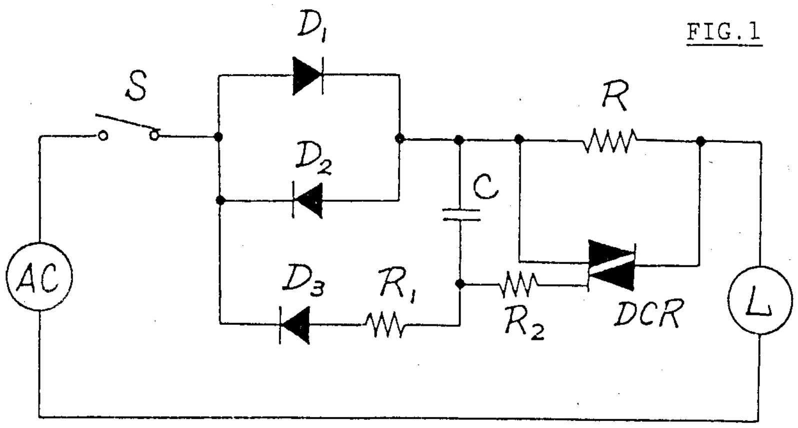

FIG. 1 shows a circuit wherein a bidirectional triode thyristor is driven by rectifying the voltage fall generated between a pair of diodes which are operated in the non-linear region of their current-voltage characteristic.

Figure 2:
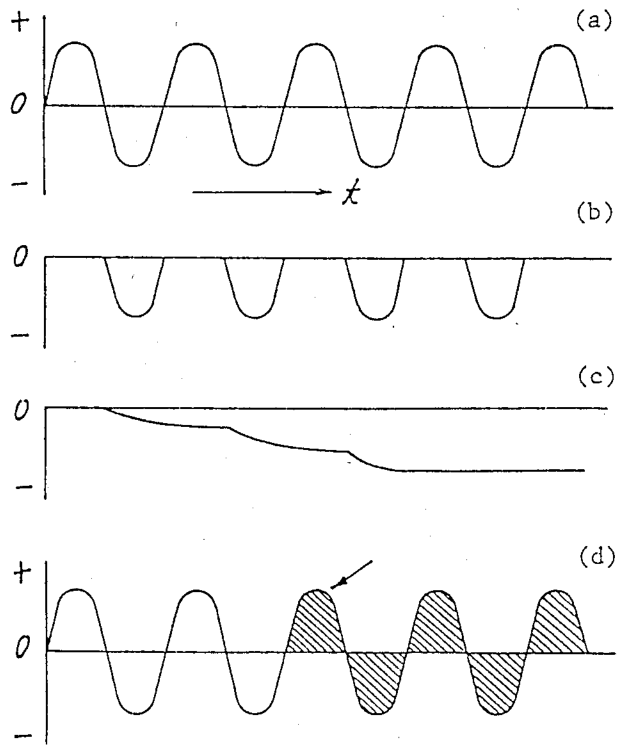

FIG. 2 shows the waveforms in the circuit in FIG. 1: FIG. 2(*a*) is the waveform of the ac power source; FIG. 2(*b*), the waveform of the current rectified by diode $D_3$; FIG. 2(*c*), the charging curve of the capacitance; and FIG. 2(*d*), the waveform of the voltage at the bidirectional triode thyristor in conduction.

The circuit in FIG. 3 is given to explain the the second mode of the bidirectional triode thyristor.

FIG. 4 shows a circuit wherein several pairs of diodes are cascaded.

In the figures, AC means ac power source; R, resistance; D, diode; S, switch; C, capacitance; and DCR, bidirectional triode thyristor.

In the current circuit as shown in FIG. 1, when switch S is closed, the circuit current flows to incandescent lamp L through, diodes $D_1$ and $D_2$ and series resistance R.

Suppose that 50 ohms of series resistance R and 100 watt incandescent lamp L are used in this circuit. As shown in Table I, the current I through incandescent lamp L is 1.6 amperes since the moment switch S is closed the resistance of incandescent lamp L is 10 ohms.

TABLE I

| Time | R (ohms) | L (ohms) | I (amperes) | RI (volts) | $RI^2$ (watts) |
|---|---|---|---|---|---|
| $T_0$ | 50 | 10 | 1.6 | 80 | 128 |
| $T_1$ | 50 | 50 | 1.0 | 50 | 50 |
| $T_2$ | 50 | 90 | 0.7 | 35 | 24 |
| $T_3$ | 0 | 100 | 1.0 | 0 | 0 |

In the current circuit in FIG. 1, since the inflow of ac current through diodes $D_1$ and $D_2$ results in a voltage fall of 0.8–1.0 volts per pair of diodes, one can obtain a voltage fall of 2–3 volts by cascading 2–3 pairs of diodes. In this circuit, the negative half cycles of the voltage generated between the pair of diodes $D_1$ and $D_2$ is rectified by diode $D_3$, and then charged in capacitance C. As apparently from the voltage curve shown in FIG. 2(*c*), the voltage at capacitance C is simultaneously increased every negative half cycle. This voltage is applied to the gate of bidirectional triode thyristor DCR through resistance $R_2$. As shown in FIG. 2(*b*), since the voltage between capacitance C increases as the curve shown in FIG. 2(*c*) when negative half cycles charges capacitance C through diode $D_3$, the gate voltage of thyristor DCR reaches its triggering level at the point shown with an arrow in FIG. 2(*d*). Thus, thyristor DCR conducts and shorts series resistance R to allow incandescent lamp L to receive its rated voltage. During the time-course from $T_0$ to $T_3$, the filament resistance of incandescent lamp L varies as shown in Table I: At $T_0$ where the switch is turned on, the current through incandescent lamp L is 1.6 amperes since respective resistances of series resistance and incandescent lamp are 50 ohms and 10 ohms. At $T_1$, the filament resistance of incandescent lamp L is 50 ohms, thus a current of 1.0 ampere comes into flow through incandescent lamp L. At $T_2$, the filament resistance of incandescent lamp L increases to 90 ohms, thus a current of 0.7 amperes flows through incandescent lamp L. At $T_3$, incandescent lamp L receives its rated voltage since bidirectional triode thyristor conducts and shorts series resistance R.

The following Table II indicates the time-course of the current through 60 W incandescent lamp L when the series resistance is set to 100 ohms, as well as the change in the filament resistance.

The current circuit in FIG. 3 is given to indicate the second mode voltage of bidirectional triode thyristor DCR, where bidirectional triode thyristor DCR is triggered with the lowest gate voltage into the conduction state when the gate is negative, and when the main current is negative at $T_1$ and positive at $T_2$.

The current circuit in FIG. 4 is intended to increase the voltage fall by cascading several pairs of diodes, $D_1$, $D_2$, $D_4$, $D_5$, $D_6$ and $D_7$.

TABLE II

| Time | R (ohms) | L (ohms) | I (amperes) | RI (volts) | $RI^2$ (watts) |
|---|---|---|---|---|---|
| $T_0$ | 100 | 20 | 0.83 | 83 | 69 |
| $T_1$ | 100 | 80 | 0.55 | 55 | 30 |
| $T_2$ | 100 | 140 | 0.42 | 42 | 17 |
| $T_3$ | 0 | 166 | 0.60 | 0 | 0 |

It is further understood by those skilled in the art that the foregoing description is a preferred embodiment according to the invention and that various changes and modifications may be made in the invention without departing from the spirit and scope thereof.

What is claimed is:

1. A device for eliminating inrush-current, comprising the components of a power switch, a thyristor, pair of diodes in reverse parallel, a resistance, a rectifier and a time constant circuit, (1) the switch, pair of diodes and resistance being connected in series;

(2) the thyristor being connected to the resistance in parallel;

(3) one terminal of the diode pair being connected to the time constant circuit through the rectifier; and (4) the time constant circuit being connected to the gate of the thyristor.

2. A device as set forth in claim 1, wherein said thyristor is a bidirectional triode thyristor.

3. A device as set forth in claim 1, wherein said time constant circuit is a CR-time constant circuit.

4. A device as set forth in claim 1, wherein two or more diode pairs are cascaded.

5. A device as set forth in claim 1, which is used in an incandescent lamp circuit.

6. A device as set forth in claim 5, wherein the resistance is set in the range from 50 to 100 ohms.

7. A method for eliminating inrush-current which occurs in a current circuit, comprising:

inserting a pair of diodes, connected in reverse parallel, within a main current circuit;

applying a voltage fall generated between the pair of diodes which are operated in the nonlinear region of their voltage-current characteristic to a CR-time constant circuit through a rectifier; and applying the output of the CR-time constant circuit to the gate of a bidirectional triode thyristor to allow the thyristor to conduct and also to short a series resistance which is inserted within the current circuit.

8. A method as set forth in claim 7, wherein two or more pairs of diodes are cascaded.

9. A method as set forth in claim 7, wherein said current circuit is an incandescent lamp circuit.

* * * * *